United States Patent [19]

Deckert et al.

[11] Patent Number: 4,968,124
[45] Date of Patent: Nov. 6, 1990

[54] VEHICLE VIEWING SYSTEM

[75] Inventors: Curt Deckert, Newport Beach; Greg Saunders, Anaheim; J. Michael Myers, Playa del Ray; Richard Demmer, Newport Beach, all of Calif.

[73] Assignee: Poly-Optical Products, Inc., Santa Ana, Calif.

[21] Appl. No.: 329,999

[22] Filed: Mar. 29, 1989

Related U.S. Application Data

[63] Continuation-in-part of Ser. No. 224,860, Jul. 27, 1988, abandoned.

[51] Int. Cl.$^5$ ............................ G02B 7/00; G02B 6/26
[52] U.S. Cl. .................................. 350/574; 350/96.25
[58] Field of Search ............... 350/574, 501, 503, 506, 350/96.24, 96.25, 96.27, 642

[56] References Cited

U.S. PATENT DOCUMENTS

| 3,501,218 | 3/1970 | Zitzelberger | 350/96.25 |
| 4,398,811 | 8/1983 | Nishioka et al. | 350/506 |

FOREIGN PATENT DOCUMENTS

| 1922924 | 11/1970 | Fed. Rep. of Germany | 350/96.25 |
| 3200294 | 7/1983 | Fed. Rep. of Germany | 350/574 |
| 3200928 | 7/1983 | Fed. Rep. of Germany | 350/576 |
| 0208710 | 12/1983 | Japan | 350/96.25 |
| 0195446 | 11/1984 | Japan | 350/96.25 |
| 0213539 | 12/1984 | Japan | 350/96.24 |

OTHER PUBLICATIONS

Rank Precision Industries, Inc. Fiber Optics, Dec. 1971.
"The Optician", vol. 143, No. 3718, Jul. 6, 1962, pp. 677, 678 & 680.

*Primary Examiner*—Bruce Y. Arnold
*Assistant Examiner*—Ronald M. Kachmarik
*Attorney, Agent, or Firm*—Nilsson, Robbins, Dalgarn, Berliner Carson & Wurst

[57] ABSTRACT

A vehicle viewing system for use on vehicles to enhance the vehicles' safe operation by minimizing blind spots. The system has an objective assembly mountable on the vehicle with its field of view substantially encompassing a blind spot. The images within the field of view are carried from the objective assembly to a viewer assembly via an image relay system. The image relay system may be a conventional fiber optic cable or a periscope assembly mounted between two fiber optic cables to extend the image transmission. The periscope assembly utilizes a lens assembly to relay images. The viewer assembly is mountable in an easy-to-see location on the vehicle suitable for viewing by the vehicle operator. The objective assembly has a lens system to enable the system to present continuous color images for viewing.

27 Claims, 5 Drawing Sheets

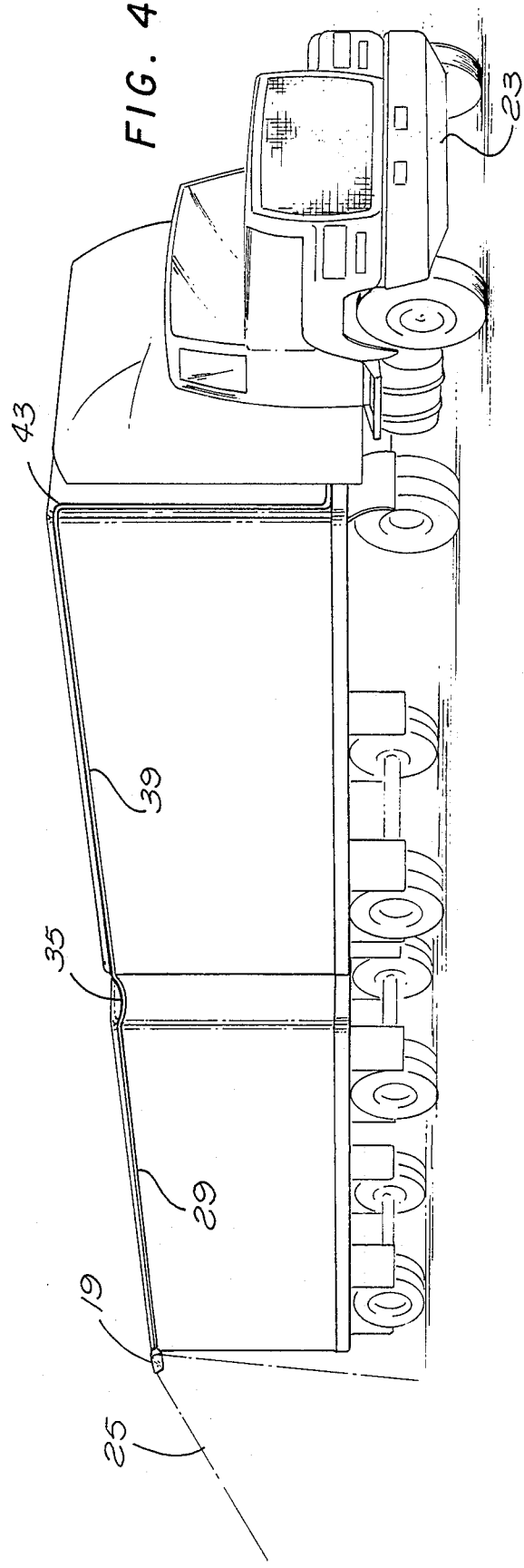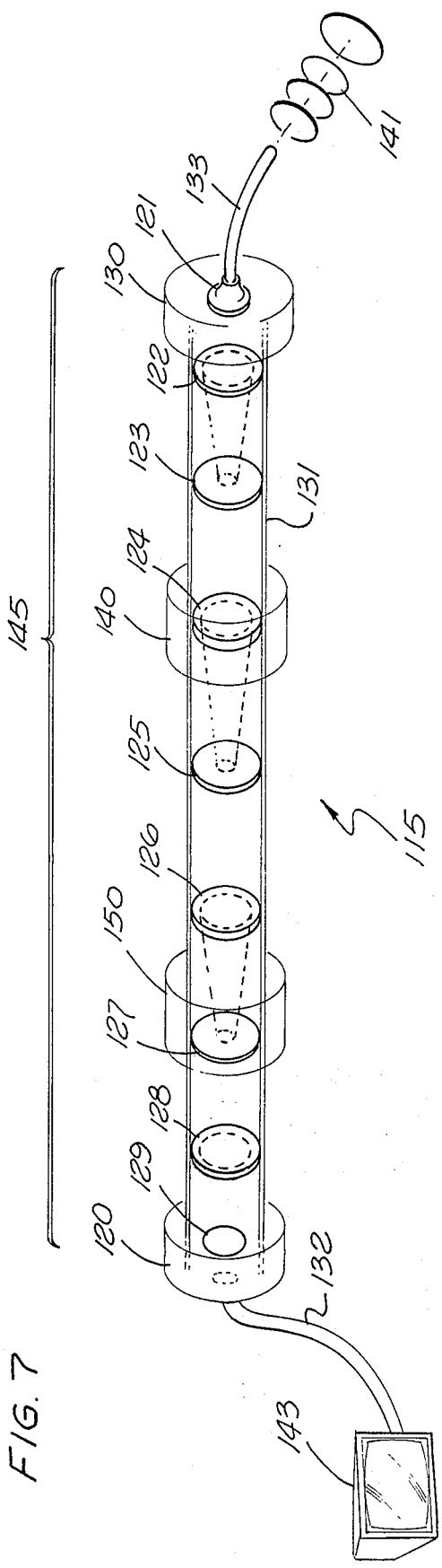

VEHICLE VIEWING SYSTEM

RELATED APPLICATION

This application is a continuation-in-part of U.S. patent application Ser. No. 224,860, filed on Jul. 27, 1988, for VEHICLE VIEWING SYSTEM, now abandoned.

FIELD OF THE INVENTION

The present invention relates generally to the field of safety devices and more particularly to viewing devices for use on vehicles.

BACKGROUND AND SUMMARY OF THE INVENTION

Vehicles used in transportation, e.g. trucks, buses, and cars, are surrounded by various zones which are often visually inaccessible to the vehicle operator during the vehicle's operation. These zones are commonly known as "blind spots" and are a significant source of danger encountered in the operation of any vehicle. Accordingly, injury to person and property may result from a vehicle operator's inability to adequately view the various blind spot zones surrounding the vehicle.

Traditionally, mirrors have been used to provide vehicle operators with views of various zones surrounding the vehicle and minimize blind spots. However, mirrors still leave blind spots and, in some cases, may cause greater danger where the vehicle operator has a false sense of security in utilizing his mirrors. Often vehicle operators, e.g. automobile drivers, have the mistaken belief their mirrors provide them with adequate viewing capability. In larger vehicles, e.g. trucks and buses, mirrors cannot be used to view certain zones, e.g. the zone directly behind a bus or truck.

Mirrors also have certain physical limitations that limit their utility as vehicle viewing devices. Mirrors may distort the vehicle operator's view of a particular area and/or provide inadequate views of certain zones, e.g. the zone immediately in front of or behind a vehicle. Mirrors are impractical for viewing objects in zones at the back of multiple truck trailers because plane mirror images are small. Additionally, inherent imperfections in mirror surfaces disperse reflected light, thus distorting light images and, at night they can increase glare. Mirrors are also subject to fogging in various weather conditions. Even when the mirrors are heated to reduce fogging, this does not solve the problem where fogged windows on the vehicle cab itself may prevent the operator from utilizing the mirrors. Further, mirrors are relatively expensive due to the cost of the mirror itself and the wind resistance and corresponding loss of fuel economy due to their presence on the vehicle exterior.

Recent developments have suggested use of video systems combined with traditional mirrors to minimize blind spots. These video systems comprise a video camera and monitor together with their associated electronics. However, video systems are relatively expensive, and often provide a poor view to the vehicle operator. These systems also have significant potential for frequent repair due to the substantial number of mechanical and electronic parts which are subject to breakdown under the harsh operating environment associated with vehicles and the severe weather conditions in which they frequently operate. Accordingly, a need exists for a vehicle viewing system that is inexpensive, reliable and provides a high quality view of any and all designated areas, e.g. a blind spot at the back of a second truck trailer, to the vehicle operator.

In this regard, the present invention is a vehicle viewing system which enables the vehicle operator to view various "blind spot" visual zones around his vehicle. The present invention comprises an objective assembly mounted on the vehicle so that its field of view covers a blind spot or other view zone. The image from the objective assembly travels via an image relay system to a viewer assembly mounted in the cab of the vehicle for viewing by the vehicle operator. The image relay system can comprise a conventional fiber optic cable periscope assembly may be also added between the objective assembly and the viewer assembly to view zones more than forty feet from the vehicle operator. Inherent physical limitations in fiber optic cables of a diameter suitable for use with a vehicle viewing device restrict image transmission to about forty feet before light loss severely limits the image utility. The image produced at the viewer assembly is a substantially true image of the field of view of the objective assembly. The present invention provides for either a non-reversed image or a mirror image which emulates traditional rear-view mirrors.

Specifically, the objective assembly comprises a housing having a glass aperture through which a large field of view image passes through to a lens system and to the receptor end of a fiber optic cable. A mirror may be added to direct the image into the lens system when the objective assembly can not be positioned to directly cover the desired field of view. The image passes through the length of the fiber optic cable to emerge at the emitter end of the fiber optic cable into a periscope assembly or directly into a viewer assembly comprising a housing with a mounting aperture and a viewing aperture. Ultimately, the image enters the viewer assembly and is directed through a suitable lens so that the vehicle operator can easily perceive the large field of view image covered by the objective assembly.

The viewer assembly may include an optional lens system through which the light passes to create a brighter image to the operator. A series of mirrors or a prism configuration may be added to the viewer assembly to reverse the image viewed at the viewing aperture and emulate a rear-view mirror. A roof prism or amici prism may be utilized in this regard.

In a further alternative embodiment, multiple objective assemblies and their corresponding image relay systems may be connected to a single viewer assembly. In this embodiment, the viewer assembly has a split screen capability wherein the image emitted from each image relay system is directed through a different area of a single viewing aperture. Thus, one viewer assembly may be used for viewing multiple images.

If a periscope assembly is used, an objective assembly which omits the mirror may be used. The periscope assembly incorporates a flexible fiber optics or conventional optics mount, thus allowing the objective assembly to cover any field of view. The flexibly mounted objective assembly directs an image through a lens system to the receptor end of a fiber optic cable. The image passes through the length the fiber optic cable to emerge at the emitter end of the cable and into an interface with the periscope assembly. The interface comprises a field lens which collects the light and focusses it on a relay lens. In turn, the relay lens creates an image four focal lengths from the end of the fiber optics emitter. The image then passes through another field lens. The periscope assembly transports the light image through alternating field and relay lenses. Ultimately, the light image is collected by a final lens mounted within an initial interface. The final lens focusses the light image on another fiber optic cable. The second fiber optic cable may be interfaced with another periscope assembly, or a viewer assembly.

The present invention is a passive viewing system, i.e. it has no mechanized or electronic parts. As a result, operational failure due to mechanical or electronic parts failure is minimized. The low profile of portions of the viewing system mounted on the exterior of the vehicle, e.g. the objective assembly, the periscope assembly and portions of the fiber optic cable, may reduce the wind resistance of the vehicle. Thus utilization of the viewing system over traditional viewing systems may result in realization of fuel savings and lower costs of operation. Further, the present invention forms intermediate images, rather than reflecting and dispersing light in the manner of plane or curved mirrors. Such image collection can result in more accurate images, with less glare, which is particularly important at night when the contrast between ambient light and automotive headlights is greater.

The present invention may also include an infra-red filtering system to decrease potential damage or fire hazards resulting from sunlight focussed on the objective assembly. The infra-red filtering system comprises a hot mirror coated lens and a cold mirror housed within the objective assembly. The hot mirror reflects infra-red rays while the cold mirror allows the majority of the remaining infra-red rays to pass through the mirror rather than being reflected with the visible ray. The infra-red filtering system may eliminate up to ninety-six percent of infra-red rays entering the objective assembly, thus reducing potential damage to the fiber optic cable.

BRIEF DESCRIPTION OF THE DRAWINGS

FIG. 4 is a perspective view of a two trailer vehicle incorporating the periscope assembly;

FIG. 7 is a cross-sectional view of the periscope assembly of the present invention.

DETAILED DESCRIPTION OF THE ILLUSTRATIVE INVENTION

Figure 1:
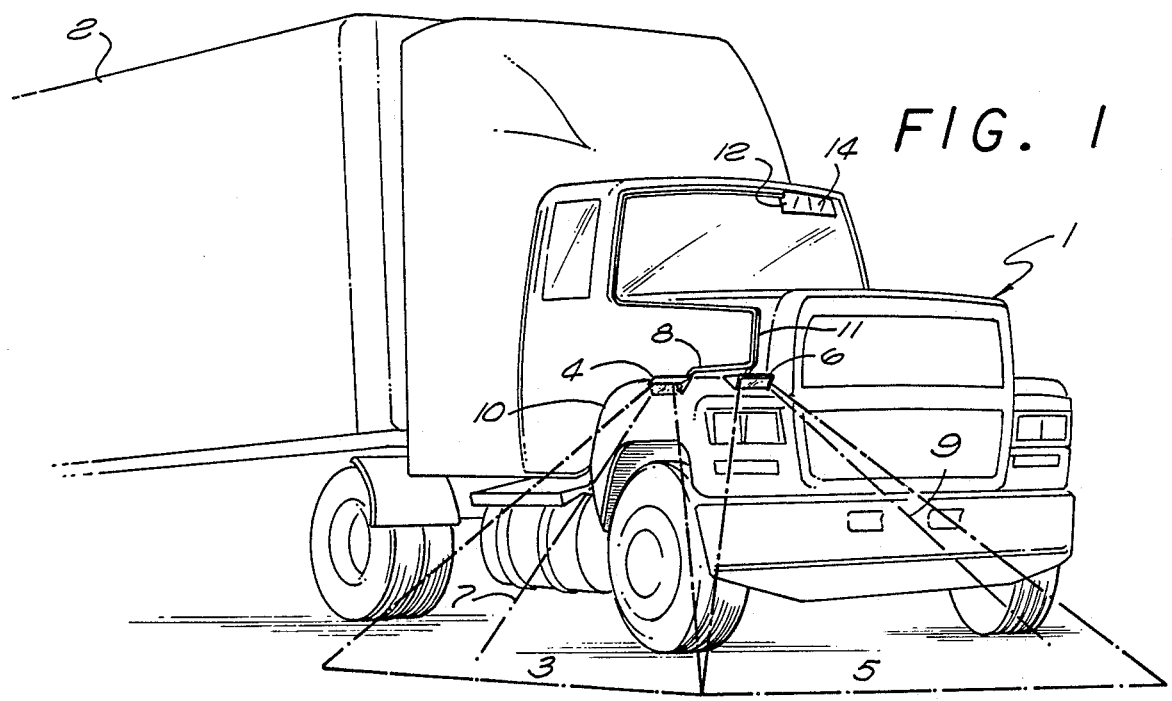
FIG. 1 is a plan and perspective view of a vehicle incorporating the present invention.

Referring initially to FIG. 1, a vehicle in the form of a truck 1 is shown incorporating the present invention. When a vehicle operator, i.e. driver, is operating the truck 1 from the driving position in the truck's cab, various zones surrounding the vehicle are visually inaccessible to him, e.g. blind spots 3 and 5. Other blind spots exist around the truck 1, e.g. behind a trailer 2 attached to truck 1 or along the passenger side of a trailer 2. However, for explanatory purposes, blind spots 3 and 5 will suffice.

Traditional viewing systems, e.g. mirrors might be used to enable the driver to view blind spots 3 and 5. However, utilizing conventional mirror viewing systems to view these zones presents various problems. For example, the view of these zones could be severely distorted by use of a convex mirror, or inadequately covered by a conventional flat mirror's field of view or they may not be viewable. Mirrors also disperse light, thus increasing glare at night. Further, adverse operating conditions may fog the mirror or the cab windows, preventing the driver from utilizing the traditional mirror system.

To resolve the problem of viewing these areas and enable the driver to view the blind spots 3 and 5, two units of the present invention may be utilized. In this regard, objective assemblies 4 and 6 are mounted on the fender 10 of the truck 1. The field of view 7 of objective assembly 4 is shown by dotted lines emanating from the objective assembly 4 and includes blind spot 3. The field of view 9 of the second objective assembly 6 is shown by dotted lines emanating from the objective assembly 6 and includes blind spot 5. Thus, the field of view of each objective assembly substantially covers a blind spot.

Structurally, the objective assembly 4 is connected to a fiber optic cable 8 which in turn is connected to a viewer assembly 12 mounted in the cab of the truck 1 to enable the driver to visually perceive the field of view 7. Similarly, the second objective assembly 6 is connected to a second fiber optic cable 11 which in turn is connected to a viewer assembly 14 mounted in the cab of truck 1 to enable the driver to visually perceive the field of view 9. As shown, each fiber optic cable, 8 and 11, can be mounted directly to the exterior of the truck's 1 body or can be mounted beneath the body panels and thus hidden from view. Either mounting of the cable should not affect its operational capabilities.

Functionally, an image of the field of view 7 or 9 passes into the respective objective assembly 4 or 6, whereupon the image is focused upon a receptor end (not shown) of the respective fiber optic cable 8 or 11. The images travel through the fiber optic cables to the emitter end (not shown) of the respective cables whereupon each image is transmitted to the respective viewer assemblies 12 or 14. At the viewer assemblies, 12 or 14, the image may be magnified and focused for viewing at the view aperture of the assembly. In any event, the image of the field of view 7 and 9 is visually perceivable at the respective viewer assembly 12 and 14.

The image perceived by the driver at each viewer assembly 12 and 14 is a color image. The image may be a non-reversed true image for visual zones in the front or side of the truck, or reversed to emulate a mirror for images of visual zones, such as zones in the back of a vehicle, traditionally viewed through a rear-view mirror. These features enable the driver to easily and accurately evaluate the images within each field of view 7 and 9. At the same time, the driver is able to view the blind spots 3 and 5. Accordingly, the driver's ability to perceive and react to any objects which may be within the fields of view 7 and 9 and within blind spots 3 and 5 is enhanced as is the safety of the vehicle's operation.

Depending on which blind spots or other visual zones around the truck 1 the driver wishes to view, additional objective assemblies, e.g. 4, and periscope assemblies may be mounted at various positions around the vehicle, including the rear of the trailer 2. Associated with each objective assembly, e.g. 4, is a separate fiber optic cable, e.g. 8, and viewer assembly, e.g. 12. Each viewer assembly, e.g. 12, may be mounted in the cab of the truck 1 although exterior mounting locations are possible. Thus, one or a plurality of units of the present invention, comprising an objective assembly, fiber optic cable and viewer assembly, with optional periscope assemblies, may be utilized in the aforesaid manner to improve the safety of operation of vehicles. It is also possible to utilize the present invention on other vehicle types, e.g. airplanes or ships, or in other situations e.g. in factories to view production lines, or environments hostile to humans, e.g. radioactive environments. Thus, the present invention can be used effectively on vehicles to increase their safety of operation as well as in other applications.

As shown in FIG. 1, the objective assemblies 4 and 6 have a relatively low profile when mounted on the truck 1. This low profile contributes to a reduction in wind resistance of the present invention which may contribute to a reduction in fuel costs associated with these safety features. The fiber optic cables 8 and 11 can be mounted substantially flush with the body or beneath the exterior body of the truck 1 to reduce wind resistance.

In the cab of truck 1, the viewer assemblies 12 and 14 can be mounted in a manner to most logically communicate to the driver the relative positions of the field of views, 7 and 9, associated with each viewer assembly. This enhances safe vehicle operation of the vehicle by providing an easy visual reference for the driver of the location and content of each zone viewed.

As shown, the present invention may be utilized as a supplemental safety feature on vehicles, e.g. in conjunction with conventional mirror systems. However, the present invention also may be utilized to replace mirrors, video cameras, or the like as various parts of a vehicle's safety viewing system.

Figure 2:
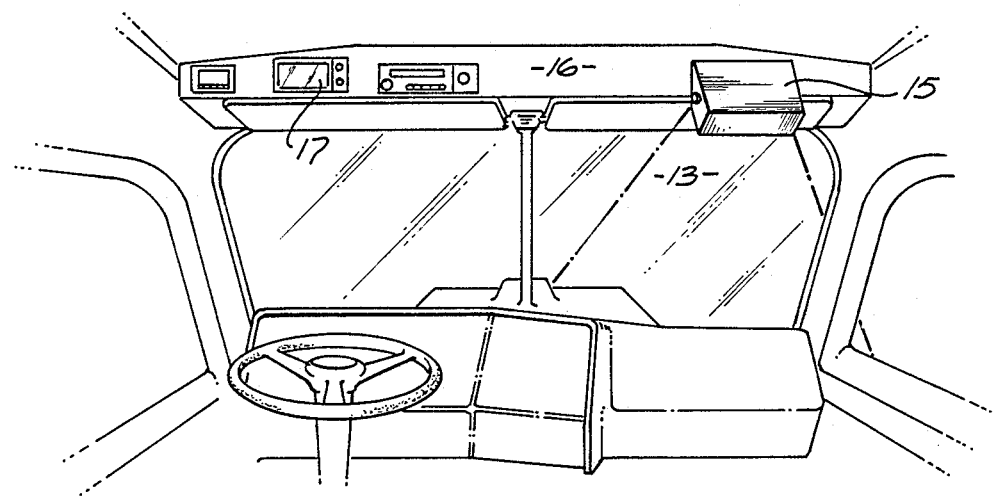
FIG. 2 is a plan and perspective view of the interior of a vehicle incorporating a further embodiment of the present invention.
Figure 3:
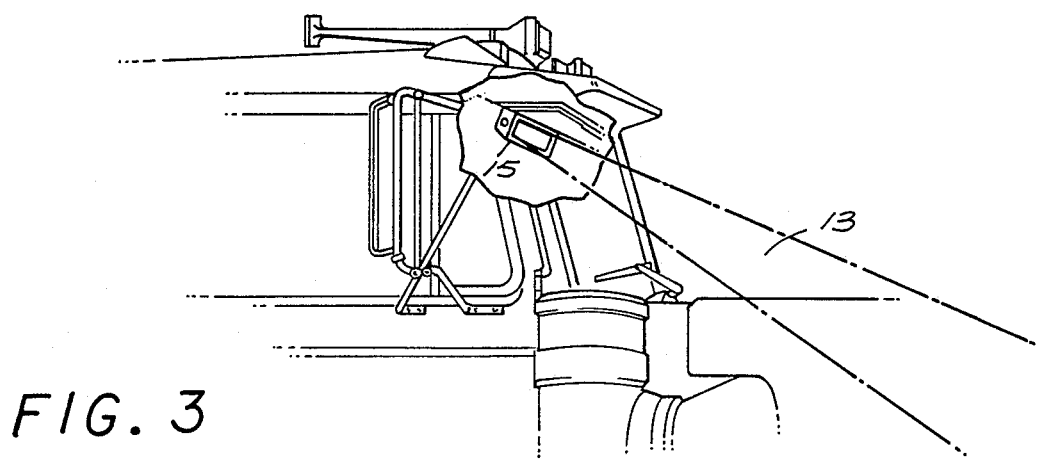
FIG. 3 is a partly ghosted exterior view of the present invention shown in FIG. 2.

Referring briefly to FIG. 2, another embodiment of the present invention illustrating an alternative mounting scheme is shown. An interior objective assembly 15 is mounted in the interior of the cab of the truck 1 (FIG. 1). The elevated position of the objective assembly 15 gives it a field of view 13 substantially encompassing the right frontal zone of the truck 1, a zone which otherwise is at least partially obscured to the driver by part of the truck itself. A interior viewer assembly 17 is flush mounted to the cab in an easy-to-see position to provide the driver with a view of the field of view 13. A fiber optic cable (not shown) located behind the cab ceiling console, 16, connects the interior objective assembly 15 to the interior viewer assembly 17. FIG. 3 more clearly shows the advantageous elevated field of view 13 afforded the driver by the elevated placement of the interior objective assembly 15 of FIG. 2.

Referring to FIG. 4, another embodiment of the present invention illustrating a periscope assembly is shown. An exterior objective assembly 19 is mounted on the back of a double trailer truck 23. The objective assembly 19 is flexibly mounted to allow a field of view image 25 to directly enter into the objective assembly. A fiber optic cable (not shown) connects the objective assembly 19 to a periscope assembly 29. The image of the field of view 25 travels through the fiber optic cable into the periscope assembly 29. The periscope assembly 29 relays the image to a second fiber optic cable 35. In turn, the second fiber optic cable 35 transmits the image to a second periscope assembly 39 whereupon the image is relayed to a third fiber optic cable 43. The image travels through the fiber optic cable 43 to a viewer assembly (not shown) for viewing by the vehicle operator.

Figure 5:
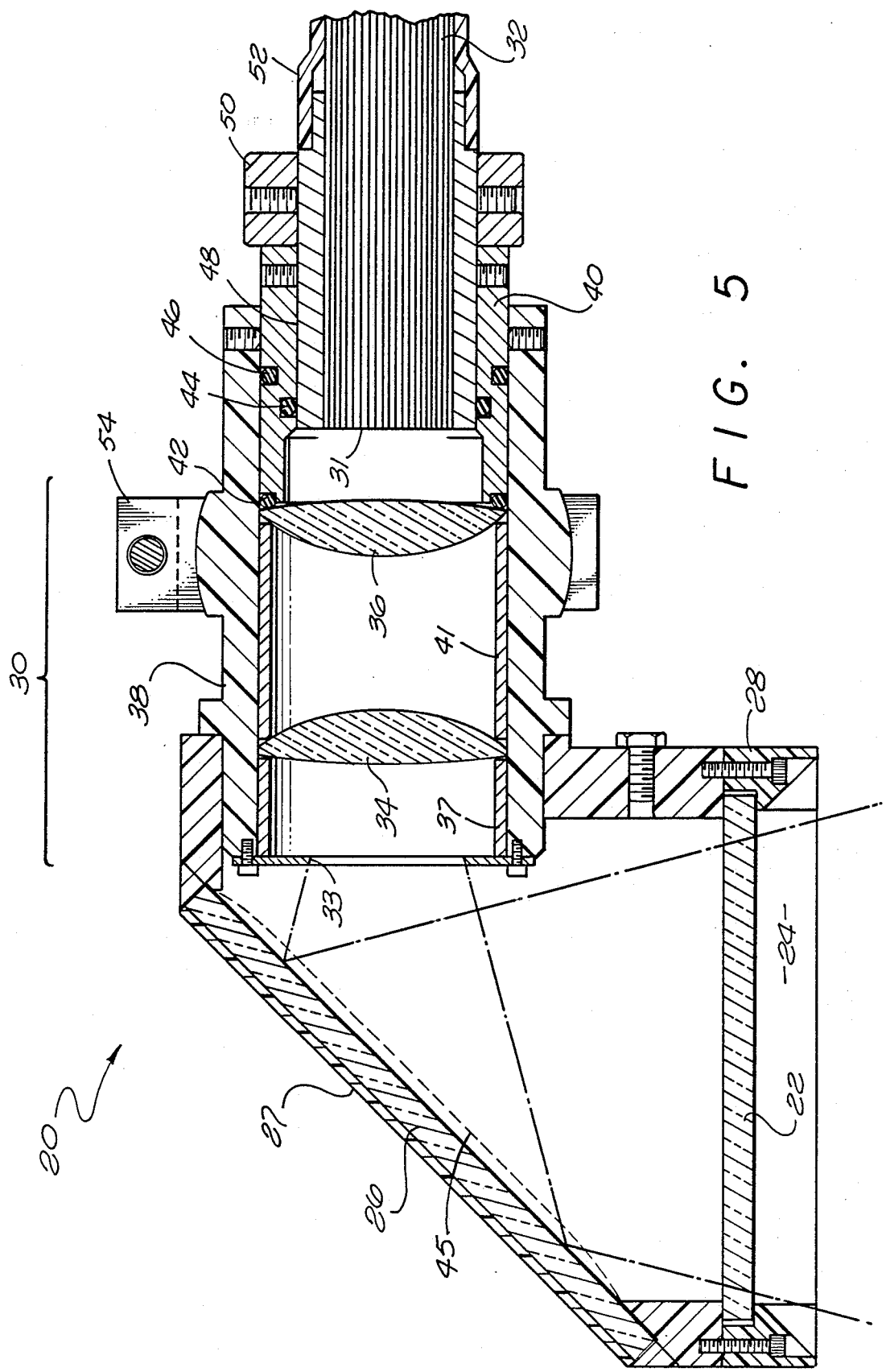
FIG. 5 is a cross-sectional view of an objective assembly of the present invention including a mirror.

Referring now to FIG. 5, the detailed structure and operation of an objective assembly 20 will be explained. The objective assembly 20 has a glass window 22 mounted in an aperture 24 through which an image passes. The passage of the image is shown by the dotted lines. The image is directed by a mirror 26 through a lens assembly 30 which focuses the image onto a receptor end 31 of a fiber optic cable 32. The image is then transmitted via the fiber optic cable 32 to a viewer assembly (not shown) for viewing by the driver.

The glass window 22 and mirror 26 are mounted in a mirror housing with the glass window 22 held in position by a frame 28. The light transmissive glass window 22 may be made of various types of optical glass, or other glass, or even may be replaced by a light transmissive plastic window depending on several factors, e.g. operational environment, functional requirements or cost. The mirror 26 is mounted at an angle to direct the light image through the glass window 22 to the lens assembly 30. The mirror 26 may be made by conventional mirror making methods or other light bending apparatus may be used. Various shapes of mirrors may be utilized, e.g. flat or concave without departing from the operational philosophy of the present invention. Alternatively, the mirror 26 may have an aspheric or spheric surface 45. In the exemplary embodiment, a conventional flat mirror, substantially free from defects, is angled at approximately 45.. In alternative embodiments, the mirror 26 may be omitted when an objective assembly can be flexibly mounted thus allowing a field of view image to directly pass from the glass window 22 to the lens assembly 30.

The field of view entering through the glass window 22 passes to the lens assembly 30 where it passes through lens aperture 33 and lenses 34 and 36. Window 22 can also be replaced with a lens for wider angle viewing. The lens assembly 30 focuses the image onto the receptor end 31 of the fiber optic cable 32. The lens system 30 is mounted in a lens housing 38 and is focusable to achieve good image quality. In the exemplary embodiment, lenses 34 and 36 are substantially identical asymmetric biconvex lenses, each being aspheric on the extreme curvature and spheric on the lesser curvature. Each lens is spaced at the appropriate optical distances and held in alignment by lens spacers 37 and 41.

In alternate embodiments, additional lenses and/or holographic or Fresnel lenses may be utilized in place of or in conjunction with the lenses 34 and 36, to further enhance the image, increase magnification, or increase field of view as needed. Similarly, other lens types, designs or systems may be utilized in place of or in conjunction with the lens assembly 30 to provide various lens systems other than as described above without departing from the concept of the present invention. Regardless, lenses comprising the lens assembly 30 may be manufactured from conventional lens material, e.g. optical glass or optical plastic, and by all suitable conventional methods.

In alternative embodiments, mirror 26 may be a cold mirror which allows infra-red rays to pass through the mirror and be absorbed by a mirror housing 27. Similarly, glass window 22 may be treated with a hot mirror coating to further filter out infra-red rays entering the objective system. Various cold mirrors, hot mirrors, or other filters may be utilized and placed in various locations within the objective assembly without departing from the operational objective of reducing the percentage of infra-red rays entering the objective assembly and thus decreasing potential fire hazards to the fiber optic cable 32.

A mating ring 40 is fixably mounted to the lens housing 38. O-rings 42, 44 and 46 seal and dampen vibration between the lens housing 38, the mating ring 40 and a mating surface 48. A reference collar 50 is mounted on the mating surface 48 and assists referencing the focus position of the receptor end 31 of fiber optic cable 32. The mating ring 40 and the lens housing 38 are held in connective engagement by the reference collar 50. A spherical adjustment bracket 54 is provided for mounting the objective assembly 20 to a vehicle or other structure.

As shown, a protective sheath 52 surrounds the fiber optic cable 32. The sheath 52 overlays a flange of the mating surface 48 to provide a substantially light tight seal between the fiber optic cable 32 and mating surface 48.

Referring briefly to the fiber optic cable 32, the cable is comprised of a bundle of conventional optic fibers manufactured by conventional methods. The cross-section of the fiber optic cable 32 may take on various shapes, e.g. rectangular or circular. In general, the cross-sectional shape of the fiber optic cable 32 will depend on the overall shape of the image projected to the operator. In the exemplary embodiment of the present invention, the image transmitted image from the aperture 24 to the receptor end 31 is rectangular and the cross section of the fiber optic cable 32 is shaped accordingly.

It is desirable that there is positional correspondence between the respective ends of the individual fibers comprising the fiber optic cable 32. That is, the position of a fiber end at the receptor end 31 (FIG. 5) is located at a corresponding position at an emitter end 76 (FIG. 6) of a fiber optic cable 58. Thus, each image pixel received at one end of the fiber optic cable 32 is transmitted to a corresponding image pixel at the other end of a fiber optic cable 58. This correspondency facilitates image integrity and thus the images received at the receiving end of a cable and transmitted to the emitter end of another cable are substantially identical.

Digressing briefly, the mirror housing 27 and lens housing 38 are preferably constructed of a sturdy plastic, e.g. poly vinyl chloride (PVC) or other suitable plastics. The mating ring 40 and reference collar 50 are preferably made a relatively light weight metal, e.g. aluminum. The O-rings 42, 44 and 46 may be made of a variety of materials including rubber, Teflon or plastic.

Figure 6:
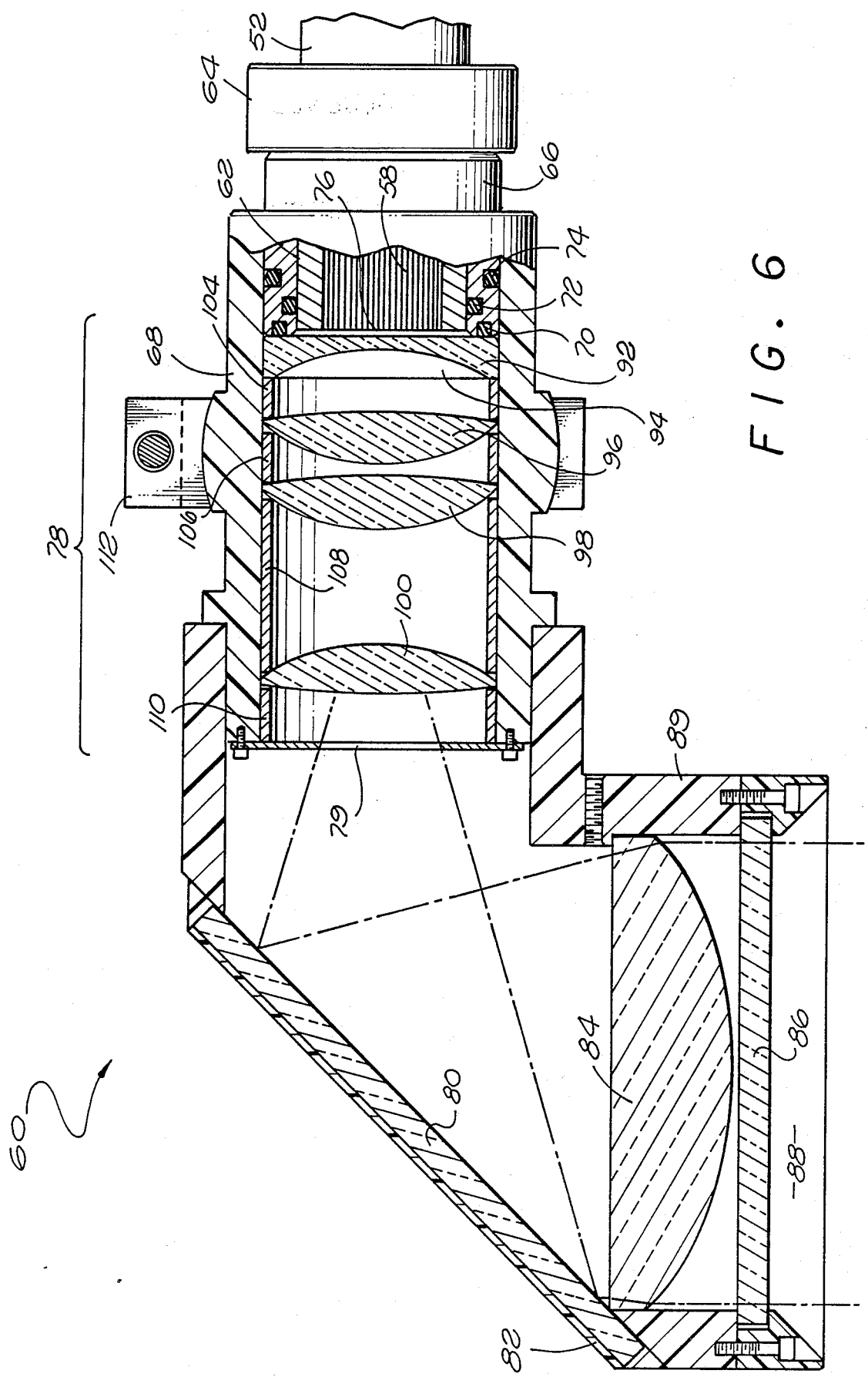
FIG. 6 is a cross-sectional view of a viewer assembly of the present invention including a lens system.

Referring to FIG. 6, a viewer assembly 60 in accordance with the present invention will now be explained. As shown, the fiber optic cable 58 is mounted into a second mating surface 62. Corresponding to the objective assembly 20 (FIG. 5), the light-tight protective sheath 52 of the fiber optic cable 58 overlays a flange (not shown) of the second mating surface 62. A second reference ring 64 assists in referencing the focus position of the emitter end 76 of the fiber optic cable 58 which comprises an objective surface. A second set of O-rings 70, 72 and 74 seal and dampen vibration between the mating surface 62, a mating ring 66 and a viewer lens housing 68.

In the exemplary embodiment, the image from the emitter end 76 of the fiber optic cable 58 passes through a lens system 78 which, among other things, focuses and magnifies the image for viewing at field lens 84.

The lens system 78 may be omitted in alternate embodiments to create an image for wider viewing. With either embodiment, the image passes through a lens aperture 79 to the field lens 84 and then to a glass window 86 mounted in a viewing aperture 88 defined by a viewer housing 82. The field lens 84 comprises a thick plano-convex or meniscus lens which collects the light directed from the fiber optic cable 58 and aligns it for viewing by the operator.

In the exemplary embodiment, a mirror 80 is mounted in the viewer housing 82. The mirror 80 directs the image received through the lens aperture 79 onto the field lens 84.

The glass window 86 is held in place by a frame 89. The image from the viewer assembly 60 can then be viewed by the vehicle operator. To facilitate viewing, an adjustable spherical bracket 112 is provided for mounting the viewer assembly 60 in a convenient, easy-to-see position.

In the exemplary embodiment,, the lens system 78 comprises a meniscus or plano-concave lens 92 and plano-convex lens 94, a pair of substantially identical asymmetric biconvex lenses 96 and 98 and a third asymmetric biconvex lens 100. Lenses 96, 98 and 100 are aspheric on their extreme curvature and spheric on their lesser curvature. In the lens system 78, each lens 92, 94, 96, 98, and 100 are spaced at appropriate optical distances and held in alignment by lens spacers 104, 106, 108 and 110.

Generally, the lens system 78 is adapted to collecting the image from the emitter end 76 of fiber optic cable 58 and providing a narrow image for viewing that is clear and focused with a minimum of chromatic aberrations at field lens 84. In addition, the lens system 78 and field lens 84 are focusable to achieve good image quality for viewing by moving emitter end 76 axially with respect to lens system 78. The omission of lens system 78 results in viewing of a smaller image in the viewer assembly 60. In particular, a truck driver's ability to perceive and react to any objects within the field of view is enhanced by a wider viewing angle of the viewer assembly 60 output.

In alternative embodiments, holographic, Fresnel lenses may be substituted in the lens system 78 or for field lens 84 to further enhance the image or increase magnification as needed. Similarly, other lens systems of varying types and designs may be utilized in place of or in conjunction with lens system 78 without departing from the concept of the present invention. Likewise, various lens types and designs may also be substituted for field lens 84. The design of lens system 78 and field lens 84 is largely a function of the contemplated use of the present invention. Variations in the types of lenses utilized and the design of the lens system itself are adaptable to accomplishing a variety of desirable viewing systems for the present invention and would be obvious to one skilled in the art. Regardless, lenses comprising the lens system 78 may be manufactured from conventional lens material, e.g. optical glass or optical plastic, and by conventional methods. The same is true for field lens 84.

In an alternative embodiment, a plurality of mirrors, a roof prism or an amici prism may be substituted for the mirror 80. This embodiment can reverse the image viewed at the viewing aperture 88 to emulate a rear-view mirror.

In a further alternative embodiment, the fiber optic cables corresponding to multiple objective assemblies may be mounted on a single viewer assembly. The single viewer assembly contains multiple mounting apertures as well as the individual elements of a viewer assembly described above, except the viewer assembly has only one viewing aperture 88. Each light image is focussed on a different area of the viewing aperture 88. The single viewing aperture 88 transmits multiple light images, creating a split screen effect.

It should be noted that the materials from which the other various parts of the viewer assembly 60 are constructed are substantially the same as for those corresponding parts of the objective assembly 20.

Referring to FIG. 7, a periscope assembly 115 in accordance with the present invention will now be explained. As shown, a fiber optic cable 133 extends from an objective assembly 141 and is mounted into a final interface 130. The mirror 80 (FIG. 6) may be omitted when the objective assembly is positioned such that sunlight will not directly enter into the viewing system, e.g. when the objective assembly is mounted at the rear of a truck. The final interface 130 incorporates a field lens 121 which collects the light emitted from the fiber optic cable 133 and focusses the light on a relay lens 122 of a lens system 145. The lens system 145 comprises a series of relay lenses, 122, 124, 126 and 128 alternating with field lenses 123, 125, and 127. The lens system 145 focusses and relays the image onto another field lens 129. An initial interface 120 secures the field lens 129. The field lens 129 focusses the image onto the receptor end of a fiber optic cable 132. The number of lenses will depend on the length and diameter of the periscope. The image then travels through the fiber optic cable to a viewer assembly 143 or a second periscope assembly (FIG. 4). The periscope assembly also comprises a tubing 131 which holds the lens system 145 and field lenses 121 and 129 in place. A plurality of couplings such as a coupling 140 surrounding the relay lens 124 and a coupling 150 surrounding the field lens 127 stabilize the tubing 131.

In alternative embodiments, lens systems of varying types and designs may be utilized in place of or in conjunction with lens system 145 without departing from the concept of the present invention. The specific configuration of the lens system 145 and field lenses 121 and 129 is largely a function of the contemplated use of the present invention. Variations in the types of lenses utilized and the design of the lens system itself are adaptable to accomplishing a variety of desirable viewing systems for the present invention and would be obvious to one skilled in the art. Regardless, lenses comprising the lens system 145 and field lenses 121 and 129 may be manufactured from conventional lens material, e.g. optical glass or optical plastic, and by conventional methods.

Further, tubing of varying types and designs may be utilized in place of tubing 131. A reflective tubing may be used to reflect heat. Variations in the types of tubing utilized and the design of the tubing itself are adaptable to accomplishing a variety of desirable viewing systems for the present invention and would be obvious to one skilled in the art. Regardless, tubing comprising the tubing 131 may be manufactured from conventional tubing material, e.g. plastic, aluminum, or steel, and by conventional methods.

In view of the above description of the preferred embodiment, it will be apparent that lens systems, objective, viewer and periscope assembly designs, mirror designs and fiber optic cable designs may be embodied in a wide variety of forms, some of which may be quite different from those specific structural and functional details disclosed. Therefore, the system of the present invention is capable of economical implementation in a variety of applications. Such modifications may include incorporation or substitution of various lens systems to effectively address the needs of the user and contemplated use of the system. Consequently, the scope of the present invention hereof is deemed to be appropriately determined by the claims as set forth below.

What is claimed is:

1. A viewing apparatus, comprising:
   an objective assembly having a housing defining a first aperture and a second aperture, an optical system mounted in the housing and cold mirror means positioned in the housing for directing an image received through the first aperture onto the optical system;
   a viewer assembly having a housing defining a mounting aperture and a view aperture; and
   a fiber optic bundle having a first end and a second end wherein the first end is connected to the second aperture of the objective assembly and the second end is connected to the mounting aperture of the viewer assembly.

2. A viewing system according to claim 1 wherein the viewer assembly further comprises an optical system mounted in the housing for receiving the image from the image relay apparatus and directing the image onto the view aperture.

3. A viewing system according to claim 2 wherein the optical system in the viewer assembly comprises a biconvex lens.

4. A viewing system according to claim 2 wherein the optical system in the viewer assembly comprises a meniscus lens.

5. A viewing system according to claim 4 wherein the optical system comprises two surfaces.

6. A viewing system according to claim 5 wherein each of the optical system surfaces is aspheric.

7. A viewing system according to claim 5 wherein each of the optical system surfaces is spheric.

8. A viewing system according to claim 5 wherein one of the optical system surfaces is spheric and the other surface is aspheric.

9. A viewing system according to claim 2 wherein the optical system in the viewer assembly comprises a reflector.

10. A viewing system according to claim 11 wherein the viewer assembly further comprises a light bending means positioned in the housing for directing the image received through the mounting aperture onto the view aperture.

11. A viewing system according to claim 10 wherein the light bending means comprise a a mirror.

12. A viewing system according to claim 1 wherein the viewer assembly further comprises a field lens mounted int eh view aperture.

13. A viewing system according to claim 1 wherein the optical system in the objective assembly comprises a biconvex lens.

14. A viewing system according to claim 1 wherein the optical system in the objective assembly comprises a meniscus lens.

15. A viewing system according to claim 14 wherein the optical system comprises two faces.

16. A viewing system according to claim 15 wherein each of the optical system surfaces is aspheric.

17. A viewing system according to claim 15 wherein each of the optical system surfaces is spheric.

18. A viewing system according to claim 15 wherein one of the optical system surfaces is spheric and the other surface is aspheric.

19. A viewing system according to claim 1 wherein the optical system in the objective assembly comprises a reflector.

20. A viewing system according to claim 1 wherein the viewer assembly further comprises a plurality of light bending apparatus mounted in the housing for reversing the image from the image relay apparatus before the image is viewed at the view aperture.

21. A viewing apparatus, comprising:
an objective assembly having a housing defining a first aperture and a second aperture, and an optical system mounted in the housing;
a viewer assembly having a housing defining a mounting aperture and a view aperture and an aspheric reflector mounted int eh housing for receiving an image and directing the image onto the view aperture; and
an image relay apparatus having a first end and a second end wherein the first end is connected to the second aperture of the objective assembly and the second end is connected to the mounting aperture of the viewer assembly.

22. A viewing apparatus, comprising:
an objective assembly having a housing defining a first aperture and a second aperture, and an optical system mounted in the housing;
a viewer assembly having a housing defining a mounting aperture and a view aperture, and a spheric reflector mounted in the housing for receiving an image and directing the image onto the view aperture; and
an image relay apparatus having a first end and a second end wherein the first end is connected to the second aperture of the objective assembly and the second end is connected to the mounting aperture of the viewer assembly.

23. A viewing apparatus, comprising:
an objective assembly having a housing defining a first aperture and a second aperture, and an aspheric reflector mounted in the housing;
a viewer assembly having a housing defining a mounting aperture and a view aperture; and
an image relay apparatus having a first end and a second end wherein the first end is connected to the second aperture of the objective assembly and the second end is connected to the mounting aperture of the viewer assembly.

24. A viewing apparatus, comprising:
an objective assembly having a housing defining a first aperture and a second aperture, and a spheric reflector mounted in the housing;
a viewer assembly having a housing defining a mounting aperture and a view aperture; and
an image relay apparatus having a first end and an second end wherein the first end is connected to the second aperture of the objective assembly and the second end is connected to the mounting aperture of the viewer assembly.

25. A viewing apparatus, comprising:
an objective assembly having a housing defining a first aperture and a second aperture, an optical system mounted in the housing and a filtering means mounted in the housing for filtering light;
a viewer assembly having a housing defining a mounting aperture and a view aperture; and
an image relay apparatus having a first end and a second end wherein the first end is connected to the second aperture of the objective assembly and the second end is connected to the mounting aperture of the viewer assembly.

26. A viewing system according to claim 25 wherein the filtering means comprises a hot mirror.

27. A viewing apparatus, comprising:
an objective assembly having a housing defining a first aperture and a second aperture, and an optical system mounted in the housing;
a viewer assembly having a housing defining a mounting aperture and a view aperture;
an image relay apparatus having a first end and a second end wherein the first end is connected to the second aperture of the objective assembly and the second end is connected to the mounting aperture of the viewer assembly; and
the image relay apparatus comprising
a first fiber optic cable having a first end and a second end wherein the first end is connected to the second aperture of the objective assembly;
a periscope assembly having a housing defining a receiving aperture and a transmitting aperture, and a lens system mounted in the housing, wherein the receiving aperture is connected to the second end of the first fiber optic cable; and
a second fiber optic cable having a first end and a second end wherein the first end is connected to the transmitting aperture of the periscope assembly and the second end is connected to the mounting aperture of the viewer assembly.

* * * * *